May 30, 1961 S. E. DANSEL 2,986,164
SAFETY BRAKE MECHANISM
Filed Jan. 21, 1958
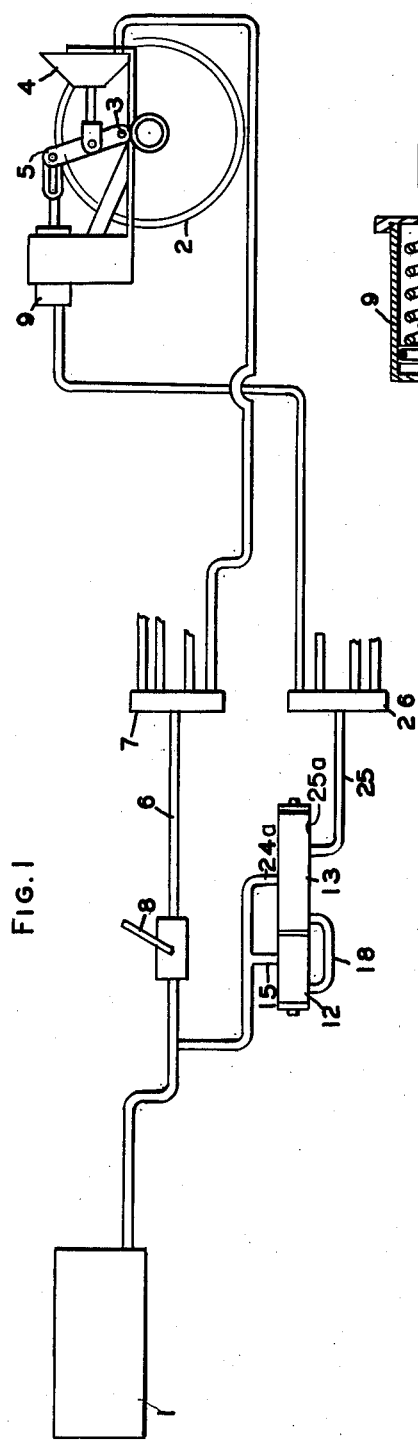
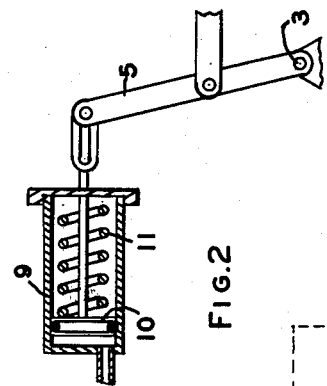
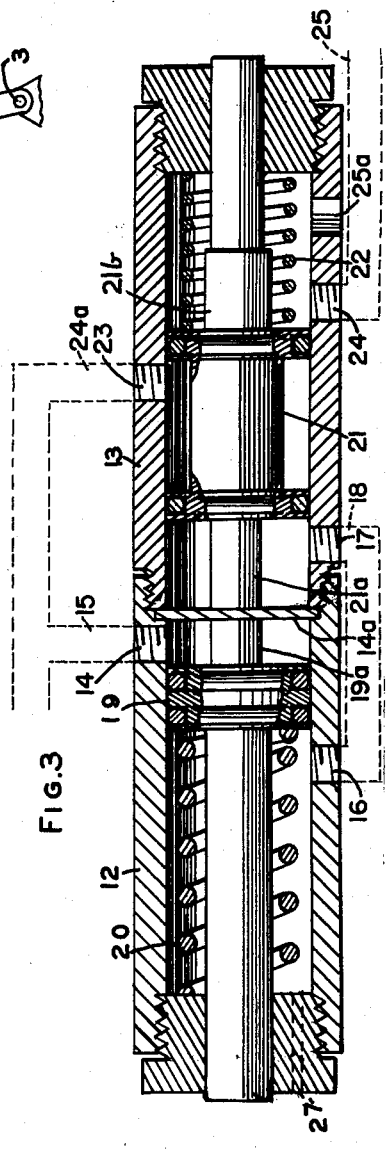
INVENTOR.
SAMUEL E. DANSEL
BY Kenneth M. Thorps
atty.

2,986,164
SAFETY BRAKE MECHANISM

Samuel E. Dansel, 237 Jefferson Road, Cheyenne, Wyo.

Filed Jan. 21, 1958, Ser. No. 710,347

3 Claims. (Cl. 137—620)

This invention relates to valve control mechanisms to automatically shut off flow of fluid from a pressure source should the pressure developed at the source fall below a predetermined minimum, the control mechanism being particularly adaptable to provide for automatic application of brakes as used to stop vehicles, such as trains, motor cars, trucks, tractors and the like, should the normal brake line pressure fail for any reason.

One of the chief objects of the invention is to equip each brake cylinder operating mechanism with mechanical means, such as a spring, to apply all brakes when the available fluid pressure falls below a predetermined minimum. Many accidents have occurred, particularly with rail vehicles, trucks and busses, because of the failure of brake pressure while the vehicle is in motion. Such failures occur due to breakage of air lines, leakage in fittings, failure of compressor, and the like; and the hand emergency brakes are not powerful enough to stop movement of the vehicle.

Another object of the invention is to provide a mechanism of the general type indicated which will apply the brakes and maintain the wheels locked until the fluid pressure has been brought back to a predetermined minimum for safe movement. This precaution prevents a driver from moving the vehicle before proper braking pressure has been developed in the braking system.

With the general objects named in view and others as will hereinafter appear, the invention consists in certain novel and useful features of construction and organization of parts as hereinafter described and claimed; and in order that it may be fully understood, reference is to be had to the accompanying drawing, in which:

Figure 1 is a diagrammatic view of a braking system as applied to the wheels of a vehicle.

Figure 2 is an enlarged cross section through an auxiliary air cylinder applying the brakes to the wheels.

Figure 3 is an enlarged cross section through the control valves of the invention.

In the said drawing, where like reference characters identify corresponding parts in all of the figures, 1 represents a compressed air cylinder or reservoir which is connected to a compressor, not shown having means to maintain a predetermined pressure in the tank or cylinder. 2 is the brake, 3 the operating shaft to apply the brake, 4 the customary brake cylinder, and 5 the brake operating lever actuated by the piston in the cylinder 4. Cylinder 4 is connected by a line 6 through a manifold 7 having connections to all wheels. Air is admitted to apply the brake through manual control valve 8.

Secured adjacent each brake cylinder 4 is an auxilary air cylinder 9, the piston 10 of said cylinder being connected to brake operating lever 5. Mounted within the cylinder 9 is a spring 11 which advances piston 10 to apply the brakes independently of actuation of brake cylinder 4. Spring 11 is normally held compressed to prevent brake application by air pressure from the source 1, as will hereinafter appear. In the position shown in the drawing, the air pressure in source 1 is low and the wheel brakes are being applied by the spring 11.

To assure that the auxiliary safety brake application is not relieved until full pressure is available in the source 1, a control mechanism is provided which comprises a pair of control valves 12 and 13, which, for convenience, are shown as independent cylinders, separated by a partition 14a. The cylinders 12 and 13, of course, can be entirely separated and even positioned at different locations on the vehicle if desired.

Cylinder 12 is formed with an inlet port 14 connected to the pressure source 1 by line 15 and with an outlet port 16 connected to an inlet port 17 in the cylinder 13 by an air line 18. When there is insufficient pressure in source 1 communication between ports 14 and 16 is cut off by a piston 19 advanced by a spring 20. When the pressure in source 1 reaches a predetermined minimum the piston 19 is displaced by compression of spring 20 and outlet port 16 is uncovered to permit air to flow to cylinder 13 through its inlet port 17. Piston 19 is provided with a stop 19a abutting the partition 14a so that said piston can never close port 14.

The cylinder 13 is fitted with a cavity or split type piston 21 which is advanced by a spring 22 against the air pressure admitted against the head of the piston through the port 17, and said piston 21 is provided with a stop 21a so that it can never close port 17. Cylinder 13 is also provided with a second air inlet port 23 leading to source 1 through a line 24a, such port 23 opening into the cavity in piston 21, the construction being such that when air is admitted through port 17 under sufficient pressure to compress spring 22, the piston 21 is moved so that its cavity places inlet port 23 in communication with outlet port 24 which is connected to auxiliary brake cylinder 9 through line 25 and minifold 26. The shaft of piston 21 is formed with a stop portion 21b which prevents movement of piston 21 to such point that its cavity will be placed in communication with a relief or exhaust port 25a through which all line pressure is relieved and there will be no impedance to brake actuation by the springs 11 in the cylinders 9.

It will be noted that the cylinder 12 is of such length that after uncovering port 16 the piston 19 may have a limited back and forth travel or dash port action to compensate for normal pressure fluctuations in the reservoir 1 and prevent intermittent application of the brakes by the springs 11. Tension of spring 20 and travel of piston 19 are so interrelated that piston 19 does not cut off port 16 until the pressure at source 1 is so low that that operation of a vehicle is dangerous. It is also to be noted that piston 21 cuts off port 24, air trapped in front of piston 21 is relieved back through line 18 and bleeds off through opening 27 in cylinder 12 or such back pressure can be relieved by a loose fit between the stem or piston 19 and the head of the cylinder. Relief of this pressure assures that the expensive action of the spring 22 in cylinder 13 is not impeded.

From the above description and drawing, it will be evident that I have produced a construction embodying all of the features of advantage set forth as desirable; and while I have described and illustrated the preferred embodiment, it is to be understood that I reserve the right to all changes within the spirit and scope of the appended claims.

I claim:

1. In a valve, a cylinder having a pair of inlet ports, an outlet port and an exhaust port, a spool piston having a cavity and a pair of heads to reciprocate in the cylinder with the first head and cavity of the piston respectively constantly exposed to the pressure at the first and second inlet ports, and a spring advancing the piston against the pressure developed against the first head, said spring being compressed by a predetermined pressure against the first head to displace the piston so that its cavity places the second inlet port in communication with the outlet port.

2. In a valve, a cylinder having a pair of inlet ports, an outlet port and an exhaust port, a spool piston having a cavity, and a pair of heads to reciprocate in the cylinder with the first head and cavity of the piston respectively constantly exposed to the pressure at the first and second ports, and a spring advancing the piston against the pressure developed against the first head, said spring being compressed by a predetermined pressure against the first head to displace the piston so that its cavity places the second inlet port in communication with the outlet port, a lessening of pressure below a predetermined point permitting the spring to displace the piston and place the outlet port in communication with the exhaust port.

3. In a valve, a cylinder, divisible into two compartments by a threaded joint, a partition at the joint dividing the cylinder into two chambers, the first chamber having inlet and outlet ports, a piston in said first chamber, a spring normally displacing the piston to prevent communication between the inlet and outlet ports but subject to compression by a predetermined inlet pressure to permit such communication, the second chamber having a pair of inlet ports, an outlet port and an exhaust port, a connection between the outlet port of the first chamber and the first inlet port of the second chamber, a spool piston having a cavity and a pair of heads to reciprocate in the second chamber with the first head and cavity of the spool piston respectively constantly exposed to the pressure at the first and second inlet ports of the second chamber, and a spring advancing the piston of the second chamber against the pressure developed against the first head of the spool piston, said spring being compressed by a predetermined pressure against the first spool head to displace the piston so that its cavity places the second inlet port of the second chamber in communication with the outlet port of said chamber.

References Cited in the file of this patent
UNITED STATES PATENTS

| | | |
|---|---|---|
| 1,884,179 | Parks | Oct. 25, 1932 |
| 2,013,665 | Messier | Sept. 10, 1935 |
| 2,211,890 | Farmer | Aug. 20, 1940 |
| 2,282,615 | Spalding | May 12, 1942 |
| 2,409,908 | Simpkins | Oct. 22, 1946 |
| 2,605,079 | Miller | July 29, 1952 |
| 2,892,310 | Mercier | June 30, 1959 |
| 2,906,378 | McNeill | Sept. 29, 1959 |